United States Patent [19]
Hoshino et al.

[11] Patent Number: 5,250,480
[45] Date of Patent: Oct. 5, 1993

[54] METHOD FOR PREPARING ZIRCON POWDER

[75] Inventors: Hirokuni Hoshino; Toshiyuki Mori; Hiroshi Yamamura; Naoki Kosugi, all of Kanagawa, Japan

[73] Assignee: Tosoh Corporation, Tokyo, Japan

[21] Appl. No.: 985,455

[22] Filed: Dec. 3, 1992

Related U.S. Application Data

[63] Continuation of Ser. No. 902,429, Jun. 24, 1992, abandoned, which is a continuation of Ser. No. 668,261, Mar. 12, 1991, abandoned.

[30] Foreign Application Priority Data

Mar. 16, 1990 [JP] Japan ................... 2-64026
Sep. 19, 1990 [JP] Japan ................... 2-247060
Dec. 18, 1990 [JP] Japan ................... 2-411264

[51] Int. Cl.$^5$ .......................... C04B 35/48
[52] U.S. Cl. .................... 501/106; 423/69; 423/326
[58] Field of Search ............ 501/106, 102, 103; 423/69, 326; 252/315.5, 313.1, 313.2, 315.6, 315.01

[56] References Cited

U.S. PATENT DOCUMENTS 3,709,706  1/1993  Sowman ............... 501/103
5,032,556  7/1991  Mori et al. .......... 501/106

FOREIGN PATENT DOCUMENTS 0302368  2/1989  European Pat. Off. .

OTHER PUBLICATIONS

Advanced Ceramic Materials vol. 1 Jan. 1986, pp. 87-92 Komarneni et al "Hydrothermal route to ultrafine powders utilizing single . . . gels".
Journal of Materials Science Letters vol. 7 1988, pp. 386-388 Chapman et al "Synthesis of fine spherical $ZrO_2$-$SiO_2$ particles . . . pyrolysis".
World Patents Index, week 22, accession No. 78-397-32A, Derwent London, GB & SU-A-564 268 (As Armn Inorg Chem) Aug. 1977.
World Patents Index week 1 accession No. 74-01089V, Derwent London, GB & SU-A-380 589 (Uralsk Sm Kiroc Polytechn) priority date Jul. 1971.
Chemical Abstract—"Sol–Gel Processing in the Zirconia-Silica System" Schwartz et al. (1988) Mater. Sci. Forum, 34–36 (Int. Ceram. Conf.) AUSTCERAM 88 pt2 841–843.

*Primary Examiner*—Mark L. Bell
*Assistant Examiner*—Paul Marcantoni
*Attorney, Agent, or Firm*—Nixon & Vanderhye

[57] ABSTRACT

A method for preparing zircon powder, which comprises mixing (1) silica sol and (2) an aqueous zirconium oxychloride solution having a concentration which would be from 0.1 to 2 mols/l after mixed with the silica sol, in a $SiO_2/ZrO_2$ molar ratio of from 0.95 to 1.10, heating the mixture to hydrolyze the zirconium oxychloride, followed by dehydration treatment to obtain a powder, heating the powder from room temperature to a calcination temperature over a period of from 0.7 to 30 hours and calcining the powder at a temperature of from 1,200° to 1,400° C. for a period of time satisfying the relation of:

$$t \geq 116 - 0.08T$$

where t is the calcination time (hr) and T is the calcination temperature (°C.), or heating the powder from room temperature to a calcination temperature over a period of from 0.8 to 70 hours and calcining the powder at a temperature higher than 1,400° C. and not higher than 1,700° C. for a period of time satisfying the relation of:

$$t \geq 18 - 0.01T$$

where t is the calcination time (hr) and T is the calcination temperature (°C.).

2 Claims, 2 Drawing Sheets

METHOD FOR PREPARING ZIRCON POWDER

This is a continuation of application Ser. No. 07/902,429 filed Jun. 24, 1992 which is a continuation of 07/668,261, filed Mar. 12, 1991, now abandoned.

The present invention relates to a method for preparing zircon powder suitable for the production of a sintered product of zircon which is useful as a high temperature structural material.

As a method for preparing zircon powder, a method is known which comprises dissolving zirconium oxychloride in ethanol, adding an equimolar amount of tetraethoxysilane to obtain a solution mixture, drying the mixture and then calcining it at a temperature of at least 1,200° C. (New Material Series "ZIRCON", p. 35–41, Rokakuho Uchida, compiled by Shigeyuki Somiya (1989)).

The powder prepared by this method has a high zircon-forming ratio as compared with the one obtained by calcining a mixture of $ZrO_2$ powder and $SiO_2$ powder, and when the calcination is conducted at a temperature of 1,700° C., the zircon-forming ratio is about 40% as quantitatively analyzed by an X-ray diffraction method. However, a sintered product produced by using such a zircon powder which still contains a large amount of unreacted raw materials, has such unreacted materials still remaining therein, although the content of unreacted silica and zirconia will be less than in the raw material zircon powder, and its composition tends to be non-uniform, whereby its high temperature characteristics tend to be poor, such being undesirable as a raw material for a high temperature structural material.

It is an object of the present invention to solve such a problem and to provide a method for preparing zircon powder having the content of unreacted raw materials minimized.

The present invention provides a method for preparing zircon powder, which comprises mixing (1) silica sol and (2) an aqueous zirconium oxychloride solution having a concentration which would be from 0.1 to 2 mols/l after mixed with the silica sol, in a $SiO_2/ZrO_2$ molar ratio of from 0.95 to 1.10, heating the mixture to hydrolyze the zirconium oxychloride, followed by dehydration treatment to obtain a powder, heating the powder from room temperature to a calcination temperature over a period of from 0.7 to 30 hours and calcining the powder at a temperature of from 1,200° to 1,400° C. for a period of time satisfying the relation of:

$$t \geq 116 - 0.08T$$

where t is the calcination time (hr) and T is the calcination temperature (°C.), or heating the powder from room temperature to a calcination temperature over a period of from 0.8 to 70 hours and calcining the powder at a temperature higher than 1,400° C. and not higher than 1,700° C. for a period of time satisfying the relation of:

$$t \geq 18 - 0.01T$$

where t is the calcination time (hr) and T is the calcination temperature (°C.).

Now, the present invention will be described in detail with reference to the preferred embodiments.

(A) BLENDING OF RAW MATERIALS

Figure 1:
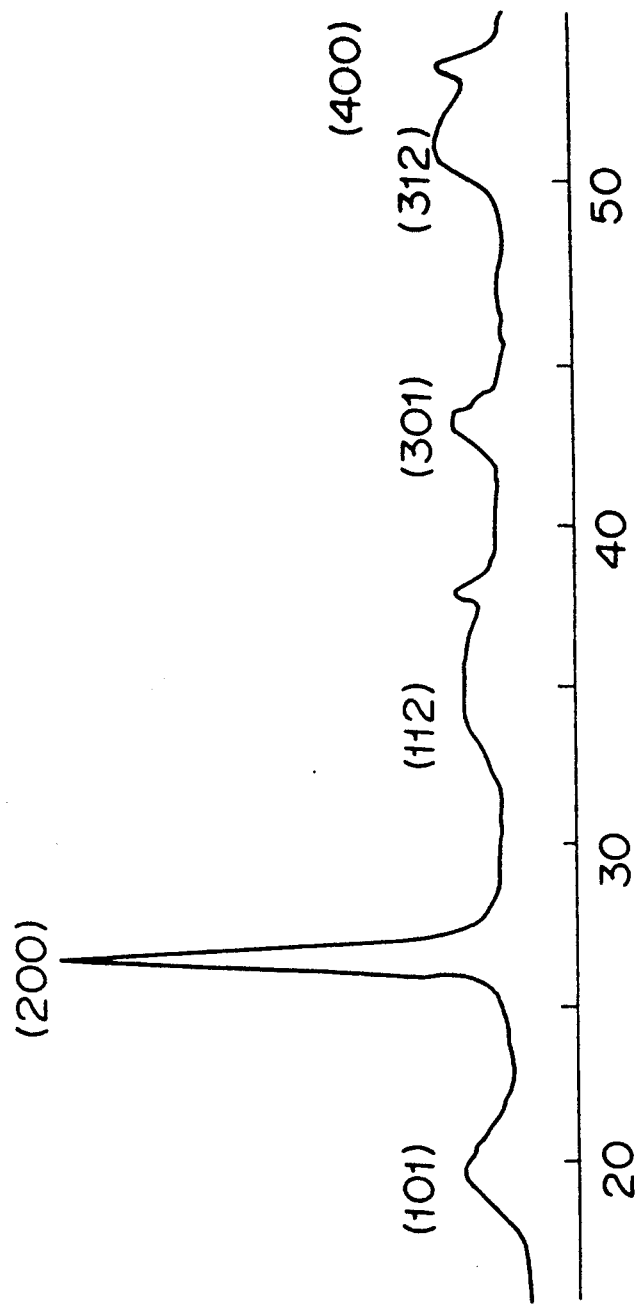
FIG. 1 is the powder X-ray diffraction pattern of the powder mixture after drying and before calcination in an Example of the present invention.

The aqueous zirconium oxychloride solution may be prepared by simply dissolving commercially available zirconium oxychloride in water. The concentration of zirconium oxychloride after mixing the aqueous zirconium oxychloride solution and the following silica sol, must be from 0.1 to 2 mols/l. If this concentration is too low, the hydrolysis tends to proceed too quickly, and zirconia and silica tend to be separated, whereby a zircon precursor having a Zr-O-Si bond tends to be hardly formed, and the particle size of resulting zirconia tends to be so large that it becomes difficult to attain a uniformly mixed state with silica. When this concentration is at least 0.1 mol/l, even if the hydrolysis is conducted under a boiling condition, the zircon precursor can be formed, and a uniform mixture can be obtained. However, if this concentration is too high, it takes a long time for the hydrolysis, thus leading to poor productivity, although a zircon precursor having a Zr-O-Si bond can still be formed by the hydrolysis. If the hydrolysis is conducted under such a condition that non-dissolved raw materials are present beyond the concentration for a saturated solution, it takes a long time for the hydrolysis, and it becomes difficult to attain a uniformly mixed state of zirconia and silica, whereby the zircon-forming ratio will be low in the subsequent calcination step.

As the silica sol, a commercial product may be used as it is. There is no particular restriction as to the concentration. However, it is preferred to use a solution containing silica at a concentration of from 10 to 30% by weight.

As is evident from the fact that zircon is represented by $SiO_2 \cdot ZrO_2$, the closer the blending ratio of these two solutions to 1 by the $SiO_2/ZrO_2$ molar ratio, the higher the purity of resulting zircon powder. In this connection, when this molar ratio is within a range of from 0.95 to 1.10, the product obtained by the present invention will be adequately pure, and it is possible to produce a high temperature structural material having adequate practical properties by sintering such a product. If the molar ratio is outside this range, the strength at a high temperature tends to be poor, although the strength at room temperature may still be high. Further, conversion to zircon proceeds also by sintering, and if it is desired to obtain a sintered product in which the $SiO_2/ZrO_2$ molar ratio is closer to 1 than the zircon powder as the raw material for sintering, it is possible to supplement a powder of the material which is deficient in the raw material, before the sintering.

The aqueous zirconium oxychloride solution prepared to have a predetermined concentration and the silica sol are mixed to hydrolyze zirconium oxychloride. This hydrolysis may be conducted based on the conditions commonly employed for the hydrolysis of zirconium oxychloride for a longer hydrolytic time i.e. by stirring at a temperature of from 80° to 100° C. for at least 160 hours. The time for the hydrolysis varies depending upon the concentration of zirconium oxychloride and the temperature for the hydrolysis. Namely, a longer period of time is required as the concentration is higher and as the temperature is lower. For example, it takes 340 hours to completely hydrolyze a solution having a zirconium oxychloride concentration of 1.7 mols/l at 100° C., while it takes 240 hours to completely hydrolyze a solution having a zirconium oxychloride concentration of 0.3 mol/l at 100° C. However, in a case where a solution containing zirconium oxychloride only i.e. containing no silica sol, is hydrolyzed, it takes only 60 hours to completely hydrolyze the solution having a zirconium oxychloride concentration of 0.3 mol/l at 100° C. Thus, the time required for completely hydrolyzing a solution containing both the silica sol and zirconium oxychloride, is substantially longer than the time required for hydrolyzing a solution containing zirconium oxychloride only under the same conditions. This is believed attributable to the fact that during the hydrolytic reaction, a reaction for forming a zircon precursor having a Zr-O-Si bond proceeds slowly. The formation of such a zircon precursor having a Zr-O-Si bond is one of the reasons for the high zircon forming rate even at a relatively low temperature at a level of about 1,200° C.

Further, if a part of the hydrolyzate after the completion of the hydrolysis is added to the above silica sol and the aqueous zirconium oxychloride solution, and the mixture is hydrolyzed, the above mentioned time for hydrolysis can be shortened, and the amount of formation of the zircon precursor having a Zr-O-Si bond increases and in the subsequent calcination step, fine zircon powder can be obtained at a lower temperature in a shorter period of time, for some unknown reasons. This effect becomes particularly distinct when the hydrolyzate is used in an amount of at least 0.5% by weight relative to the total amount of the silica sol and the aqueous zirconium oxychloride solution. However, if it exceeds 20% by weight, the rate of hydrolysis tends to be low. Also in this case, the concentration of zirconium oxychloride is from 0.1 to 2 mols per liter of the total volume of the silica sol and the aqueous zirconium oxychloride solution. The $SiO_2/ZrO_2$ molar ratio in the solution mixture comprising the silica sol, the aqueous zirconium oxychloride solution and the hydrolyzate must be from 0.95 to 1.10. The treatments subsequent to this hydrolysis may be conducted under the same conditions as in the case where only the silica sol and the aqueous zirconium oxychloride solution are employed. If this method of using a part of the hydrolyzate as a part of the raw material, is repeated, the effect of this method becomes more remarkable.

The hydrolyzate dispersion prepared as described above, is dehydrated to obtain a homogeneous mixture comprising the zircon precursor having a Zr-O-Si bond, silica and zirconia. This dehydration can be conducted by various methods. However, it is usually preferred to employ spray drying or evaporation to dryness under atmospheric pressure or under reduced pressure, since it is directed to treatment of fine powder dispersed in a large amount of a liquid.

(B) CALCINATION

When the powder mixture prepared as described above is calcined at a temperature of from 1,200° to 1,400° C., the mixture is heated from room temperature to the calcination temperature over a period of from 0.7 to 30 hours, and the calcination temperature and calcination time are set to satisfy the relation of:

$$t \geq 116 - 0.08T$$

where t: calcination time (hr)
T: calcination temperature (°C.)

When the calcination is conducted at a temperature higher than 1,400° C. and not higher than 1,700° C., the mixture is heated from room temperature to the calcination temperature over a period of from 0.8 to 70 hours, and the calcination temperature and the calcination time are set to satisfy the relation:

$$t \geq 18 - 0.01T$$

where t: calcination time (hr)
T: calcination temperature (°C.)

Figure 2:
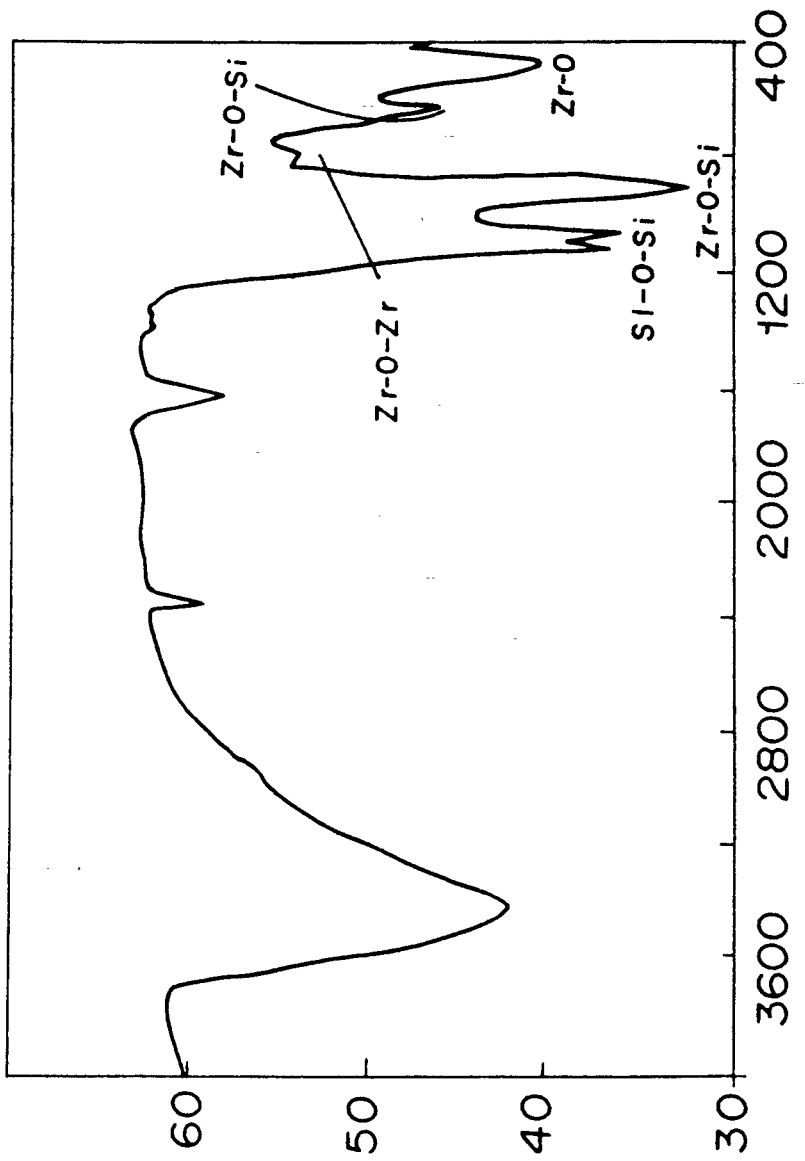
FIG. 2 is the infrared absorption spectrum of the powder mixture in the same Example.

By such calcination, zircon powder can be obtained which contains a total of not higher than 4 volume % of unreacted raw materials, as measured by an X-ray diffraction method. Using such zircon powder of high purity as the raw material, it is possible to obtain a sintered product having higher purity and good mechanical properties at both room temperature and high temperature. The X-ray diffraction pattern of the dried powder of the mixture after hydrolysis is specific to the crystal structure of zircon, as shown in FIG. 1. The infrared absorption spectrum of this powder is as shown in FIG. 2, which indicates in addition to the absorption by the zircon precursor having a Zr-O-Si bond, absorptions by Si-O-Si and Zr-O-Zr attributable to unreacted raw material silica and zirconia. This indicates that during the hydrolytic reaction, the zircon precursor having a Zr-O-Si bond has formed in zirconia and silica. This zircon precursor serves as a seed crystal. However, at a temperature of lower than 1,200° C., the zircon-forming rate will not be high enough. On the other hand, if it exceeds 1,700° C., formed zircon is likely to decompose into silica and zirconia, such being undesirable.

To complete the zircon-forming reaction, it is thus necessary to conduct the calcination at a temperature of from 1,200° to 1,700° C. for at least a predetermined period of time. In order to obtain zircon powder having good sinterability i.e. having a small particle size, it is preferred to conduct the calcination at a low temperature in a short period of time within the above conditions for calcination.

With respect to the temperature-raising rate up to the calcination temperature, it is necessary that in the case where the calcination is conducted at a temperature of from 1,200° to 1,400° C., the temperature is raised from room temperature to the calcination temperature over a period of from 0.7 to 30 hours and that in the case where the calcination is conducted at a temperature higher than 1,400° C. and not higher than 1,700° C., the temperature is raised from room temperature to the calcination temperature over a period of from 0.8 to 70 hours. If the temperature is raised over a longer period of time than specified above, the zircon-forming ratio tends to decrease. This is believed to be attributable to the fact that formation of zircon by the reaction of zirconia and silica readily takes place when both zirconia and silica are in a non-crystalline state, and the crystallization temperatures of zirconia and silica are lower than the temperature for the conversion reaction of zirconia and silica to zircon, and accordingly, if the temperature-raising time is prolonged, the crystallization of zirconia and silica is likely to proceed prior to the conversion reaction to zircon of unreacted zirconia and silica existing around the zircon precursor having a Zr-O-Si bond, and the conversion reaction to zircon is thereby hindered. On the other hand, it is not practical to raise the temperature in a shorter period of time than the above specified range, since such is beyond the capacity of an ordinary furnace for calcination.

The mechanism for the effect of the present invention is not fully understood. However, it is considered that unreacted zirconia and silica surround and contact the zircon precursor having a Zr-O-Si bond formed during the hydrolysis, and conversion to zircon proceeds during the calcination step, whereby zircon powder having a high zircon-forming ratio will be formed.

As described in the foregoing, according to the present invention, highly pure zircon powder can readily be prepared.

Now, the present invention will be described in further detail with reference to Examples and Comparative Examples. However, it should be understood that the present invention is by no means restricted by such specific Examples. In the following Examples and Comparative Examples, the quantitative analyses of the components of the zircon powder products were made by the following formula from the area ratios of five peaks at (200) of zircon, (111) and (11-1) of monoclinic zirconia, (101) of tetragonal system zirconia and (101) of $\alpha$-cristobalite at $2\theta = 18°$ to $32°$ by the X-ray diffraction analyses:

$$I_{ZR}(200)/\{I_{ZR}(200)+I_M(111)+I_M(11\text{-}1)+I_T(101\text{-})+I_C(101)\}$$

wherein I indicates the intensity of X-rays, ZR indicates zircon, M indicates monocyclic zirconia, T indicates tetragonal system zirconia, C indicates $\alpha$-cristobalite and numerals in the brachet ( ) indicate miller indices.

EXAMPLES 1 TO 4 AND COMPARATIVE EXAMPLES 1 to 3

227.5 g of zirconium oxychloride octahydrate (manufactured by TOSOH CORPORATION, the same applies hereinafter) was dissolved in 2,000 ml of water to obtain an aqueous zirconium oxychloride solution having a concentration of 0.2 mol/l. This aqueous zirconium oxychloride solution and 120.2 g of silica sol (manufactured by Nissan Chemical Co., Ltd., concentration: 20% by weight, the same applies hereinafter) were mixed in a separable flask ($SiO_2/ZrO_2$ molar ratio: 1.00) and subjected to heat treatment at 100° C. for 168 hours under reflux. However, in Example 2, the hydrolyzed solution was added to the raw material solution mixture in an amount of 1% by weight, followed by heat treatment at 100° C. for 150 hours under reflux. The obtained solution was, after addition of butanol, subjected to drying treatment at 80° C. under reduced pressure.

The obtained powder was heated in the atmosphere to the calcination temperature in a predetermined time and maintained at the calcination temperature for a predetermined time to obtain zircon powder.

EXAMPLES 5 TO 9 AND COMPARATIVE EXAMPLE 4

455.0 g of zirconium oxychloride octahydrate was dissolved in 2,000 ml of water to obtain an aqueous zirconium oxychloride solution having a concentration of 0.4 mol/l. This aqueous zirconium oxychloride solution and 240.3 g of silica sol were mixed in a separable flask ($SiO_2/ZrO_2$ molar ratio: 1.00) and subjected to heat treatment at 100° C. for 240 hours under reflux. However, in Example 6, the hydrolyzed solution was added to the raw material solution mixture in an amount of 1% by weight, followed by heat treatment at 100° C. for 210 hours under reflux. Further, in Example 7, the hydrolyzed solution was added to the raw material solution mixture in an amount of 10% by weight, followed by heat treatment at 100° C. for 200 hours under reflux.

The obtained solution was, after an addition of butanol, subjected to drying treatment at 80° C. under reduced pressure.

The conditions for calcination were the same as in Examples 1 to 4 and Comparative Examples 1 to 3.

EXAMPLES 10 TO 13 AND COMPARATIVE EXAMPLES 5 to 7

909.9 g of zirconium oxychloride octahydrate was dissolved in 2,000 ml of water to obtain an aqueous zirconium oxychloride solution having a concentration of 0.8 mol/l. This aqueous zirconium oxychloride solution and 480.8 g of silica sol were mixed in a separable flask ($SiO_2/ZrO_2$ molar ratio: 1.00) and subjected to heat treatment at 100° C. for 336 hours under reflux. However, in Example 11, the hydrolyzed solution was added to the raw material solution mixture in an amount of 1% by weight, followed by heat treatment at 100° C. for 310 hours under reflux.

The obtained solution was, after an addition of butanol, subjected to drying treatment at 80° C. under reduced pressure.

The conditions for calcination were the same as in Examples 1 to 4 and Comparative Examples 1 to 3.

EXAMPLES 14 TO 17 AND COMPARATIVE EXAMPLES 8 to 10

1,933.5 g of zirconium oxychloride octahydrate was dissolved in 2,000 ml of water to obtain an aqueous zirconium oxychloride solution having a concentration of 1.7 mols/l. This aqueous zirconium oxychloride solution and 1,021.6 g of silica sol were mixed in a separable flask ($SiO_2/ZrO_2$ molar ratio: 1.00) and subjected to heat treatment at 100° C. for 384 hours under reflux. However, in Example 15, the hydrolyzed solution was added to the raw material solution mixture in an amount of 1% by weight, followed by heat treatment at 100° C. for 370 hours under reflux.

The obtained solution was, after an addition of butanol, subjected to drying treatment at 80° C. under reduced pressure.

The conditions for calcination were the same as in Examples 1 to 4 and Comparative Examples 1 to 3.

COMPARATIVE EXAMPLES 11 AND 12

56.8 g of zirconium oxychloride octahydrate was dissolved in 2,000 ml of water to obtain an aqueous zirconium oxychloride solution having a concentration of 0.05 mol/l. This aqueous zirconium oxychloride solution and 30.0 g of silica sol were mixed in a separable flask ($SiO_2/ZrO_2$ molar ratio: 1.00) and subjected to heat treatment at 100° C. for 168 hours under reflux.

. The obtained solution was, after an addition of butanol, subjected to drying treatment at 80° C. under reduced pressure.

The obtained powder was heated in the atmosphere to the calcination temperature in a predetermined time and maintained at the calcination temperature for 8 hours to obtain zircon powder.

The above conditions and the results are shown in Tables 1 and 2. In these Tables, ZOC represents the aqueous zirconium oxychloride solution, and ZR represents zircon (the same applies in Table 3).

EXAMPLES 18 AND 19 AND COMPARATIVE EXAMPLES 13 AND 14

Zircon powders were obtained under the same conditions as in Example 5 except that the amount of the same silica sol as used in Example 5 was changed. These powders and the powder obtained in Example 5 were, respectively, molded and calcined at 1,680° C. for 4 hours to obtain sintered products, which were processed to obtain test pieces having a size of 3×4×40 mm, whereupon a three point flexural strength was measured. These conditions and the results are shown in Table 3. In Table 3, the value for room temperature three point flexural strength is an average value with respect to ten test pieces, and the value for 1,400° C. three point flexural strength is an average value with respect to three test pieces.

TABLE 1

| Example No. | ZOC concentration (mol/l) | Calcination temp. (°C.) | Temp. raising time (hr) | Calcination time (hr) | Purity of formed ZR (vol %) |
| --- | --- | --- | --- | --- | --- |
| 1 | 0.19 | 1,350 | 22 | 8 | 96 |
| 2 | 0.19 | 1,250 | 1.1 | 8 | 96 |
| 3 | 0.19 | 1,500 | 49 | 6 | 98 |
| 4 | 0.19 | 1,500 | 1.2 | 4 | 99 |
| 5 | 0.36 | 1,350 | 22 | 10 | 96 |
| 6 | 0.36 | 1,250 | 1.1 | 8 | 98 |
| 7 | 0.36 | 1,250 | 1.1 | 4 | 97 |
| 8 | 0.36 | 1,500 | 49 | 8 | 97 |
| 9 | 0.36 | 1,500 | 1.1 | 6 | 100 |
| 10 | 0.67 | 1,350 | 22 | 8 | 100 |
| 11 | 0.67 | 1,300 | 1.1 | 8 | 100 |
| 12 | 0.67 | 1,500 | 49 | 4 | 100 |
| 13 | 0.67 | 1,500 | 1.2 | 4 | 100 |
| 14 | 1.21 | 1,350 | 22 | 8 | 97 |
| 15 | 1.21 | 1,250 | 1.1 | 8 | 98 |
| 16 | 1.21 | 1,500 | 49 | 4 | 98 |
| 17 | 1.21 | 1,500 | 1.2 | 4 | 100 |

TABLE 2

| Comparative Example No. | ZOC concentration (mol/l) | Calcination temp. (°C.) | Temp. raising time (hr) | Calcination time (hr) | Purity of formed ZR (vol %) |
| --- | --- | --- | --- | --- | --- |
| 1 | 0.19 | 1,150 | 1.0 | 8 | 40 |
| 2 | 0.19 | 1,350 | 1.1 | 1 | 83 |
| 3 | 0.19 | 1,500 | 80 | 10 | 92 |
| 4 | 0.36 | 1,500 | 80 | 10 | 92 |
| 5 | 0.67 | 1,150 | 1.0 | 8 | 75 |
| 6 | 0.67 | 1,350 | 1.1 | 1 | 92 |
| 7 | 0.67 | 1,500 | 80 | 10 | 93 |
| 8 | 1.21 | 1,150 | 1.0 | 8 | 78 |
| 9 | 1.21 | 1,350 | 1.1 | 1 | 90 |
| 10 | 1.21 | 1,500 | 80 | 10 | 92 |
| 11 | 0.05 | 1,350 | 1.1 | 8 | 70 |
| 12 | 0.05 | 1,500 | 1.2 | 8 | 85 |

TABLE 3

| | ZOC concentration (mol/l) | SiO$_2$/ZrO$_2$ molar ratio | Purity of formed ZR (vol %) | Room temp. three point flexural strength (MPa) | 1,400° C. three point flexural strength (MPa) |
| --- | --- | --- | --- | --- | --- |
| Example | | | | | |
| 5 | 0.36 | 1.00 | 96 | 320 | 325 |
| 18 | 0.36 | 0.96 | 96 | 305 | 308 |
| 19 | 0.36 | 1.08 | 96 | 314 | 310 |
| Comparative Example | | | | | |
| 13 | 0.37 | 0.93 | 92 | 305 | 210 |
| 14 | 0.35 | 1.12 | 94 | 308 | softened |

We claim:

1. A method for preparing zircon powder having a purity of at least 96%, which comprises mixing (1) silica sol and (2) an aqueous zirconium oxychloride solution having a concentration which would be from 0.1 to 2 mols/l after mixed with the silica sol, in a SiO$_2$/ZrO$_2$ molar ratio of from 0.95 to 1.10, heating the mixture to hydrolyze the zirconium oxychloride, followed by dehydration treatment to obtain a powder, heating the powder from room temperature to a calcination temperature over a period of from 0.7 to 30 hours and calcining the powder at a temperature of from 1,200° to 1,400° C. for a period of time satisfying the relation of:

$$t \geq 116 - 0.08T$$

where t is the calcination time (hr) and T is the calcination temperature (°C.), or heating the powder from room temperature to a calcination temperature over a period of from 0.8 to 70 hours and calcining the powder at a temperature higher than 1,400° C. and not higher than 1,700° C. for a period of time satisfying the relation of:

$$t \geq 18 - 0.01T$$

where t is the calcination time (hr) and T is the calcination temperature (°C.).

2. A method for preparing zircon powder, which comprises mixing (1) silica sol, (2) an aqueous zirconium oxychloride solution containing from 0.1 to 2 mols of zirconium oxychloride per liter of the total volume of this solution and said silica sol and (3) a hydrolyzate of a solution mixture comprising silica sol and an aqueous zirconium oxychloride solution, so that the SiO$_2$/ZrO$_2$ molar ratio would be from 0.95 to 1.10 and said hydrolyzate (3) should be in an amount of from 0.5 to 20% by weight relative to the total amount of said silica sol (1) and said aqueous zirconium oxychloride solution (2), heating the mixture to hydrolyze the zirconium oxychloride, followed by dehydration treatment to obtain a powder, heating the powder from room temperature to a calcination temperature over a period of from 0.7 to 30 hours and calcining the powder at a temperature of from 1,200° to 1,400° C. for a period of time satisfying the relation of:

$$t \geq 116 - 0.08T$$

where t is the calcination time (hr) and T is the calcination temperature (°C.), or heating the powder from room temperature to a calcination temperature over a period of from 0.8 to 70 hours and calcining the powder at a temperature higher than 1,400° C. and not higher than 1,700° C. for a period of time satisfying the relation of:

$$t \geq 18 - 0.01T$$

where t is the calcination time (hr) and T is the calcination temperature (°C.).

* * * * *